No. 791,157. PATENTED MAY 30, 1905.
A. H. MacNUTT.
STONE SAW.
APPLICATION FILED NOV. 25, 1904.

Witnesses:- Inventor,
F. C. Fliedner Archibald H. MacNutt
By Geo. H. Strong Atty No. 791,157.                                              Patented May 30, 1905.

UNITED STATES PATENT OFFICE.

ARCHIBALD H. MacNUTT, OF SAN FRANCISCO, CALIFORNIA.

STONE-SAW.

SPECIFICATION forming part of Letters Patent No. 791,157, dated May 30, 1905.

Application filed November 25, 1904. Serial No. 234,224.

*To all whom it may concern:*

Be it known that I, ARCHIBALD H. MAC-NUTT, a citizen of the United States, residing in the city and county of San Francisco and State of California, have invented new and useful Improvements in Stone-Saws, of which the following is a specification.

My invention relates to improvements in blades which are designed for sawing granite, marble, stone, or other material where abrasives are employed.

It consists in the construction of the saw in such a manner that the abrasive material used in conjunction therewith will be constantly fed beneath the edge of the saw to produce the greatest downward and the least lateral cutting consistent with good work.

It also consists in such a construction of the saw that the feeding devices are constantly renewed as the saw wears away and in details of construction, which will be more fully explained by reference to the accompanying drawings, in which—

Figure 1:
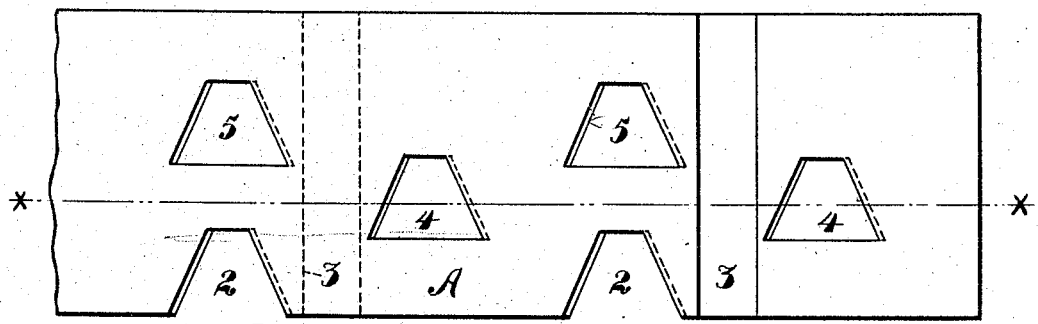
Figure 2:
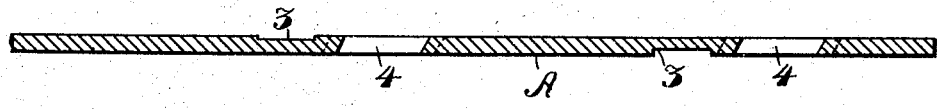

Figure 1 is a side elevation of my improved blade. Fig. 2 is a section on line $x\,x$ of Fig. 1.

In the construction of my saw I employ a blade A of any suitable or desired width or material. The blade has the ends secured in a suitable frame, to which power may be applied to reciprocate the blade in the direction of the cut to be made. In the lower edge of this blade A are made a series of A-shaped openings 2, having the widest portion of the lower edge of the blade and converging upwardly to form a trapezoidal opening, of which the bottom will be the surface upon which the blade rests. These openings made in this shape serve to feed the steel shot or other abrasive material used constantly beneath the lower edge of the saw-blade, and thus increase the cutting effect as the saw is reciprocated. In addition to the divergent sides of these openings 2 the openings are made diagonal or inclined with relation to the line of travel of the blade, as shown in the horizontal section Fig. 2. These opposite diagonal faces may be substantially parallel with each other, as shown, and the effect will be to carry the abrasive material in the line with the incline of one of the edges when the saw is moved in one direction and to the opposite side when the saw is moved in the opposite direction. The material is thus distributed over a length equal to that of these inclined edges, with the effect of more rapidly carrying the abrasive material beneath the bottom of the saw and preventing its being thrown out to the sides and wasted in unnecessary lateral abrasion. Intermediate between these openings 2 are vertical channels (shown at 3) upon opposite sides of the sawblade. These channels also serve to clear the cut of the abrasive material and cause it to be delivered below the lower edge of the saw. Intermediate between the openings 2 and the channels 3 are other trapezoidal openings, 4, similar to those shown at 2 and so located that their lower edges are below the horizontal level of the upper edges of the openings 2. When the saw has worn down to such a point that the openings 2 are nearly worn out of the blade, the lower edges of the openings 4 will be cut away, and these openings 4 then take the place of the original openings 2. Above the openings 2 and intermediate between the openings 4 may be another set of similar openings, as at 5, and so on for any depth of saw-blade that it may be desired to use. By constructing the blade in this manner I am enabled to give it any thickness to provide the required stiffness for work to be done.

The openings 2 4 5 make a very even distribution of the abrasive material, tending to force it constantly beneath the lower edge of the saw, and as the blade wears away and one set of openings becomes useless another set is disclosed and takes up the work.

The vertical channels 3 may be made of sufficient depth for the required purpose without weakening the saw, since these channels are made alternately upon opposite sides of the saw and between the trapezoidal openings.

Having thus described my invention, what I claim, and desire to secure by Letters Patent, is—

1. An abrasive saw having openings made at intervals in its lower edge, said openings being divergent from the top downwardly and having their walls diagonal relative to the line of travel of the saw.

2. In an abrasive saw, a blade having a plurality of trapezoidal openings alternating between the upper and lower edges of the saw, said openings lying in such planes that the lower edge of a series of these openings will be cut away before the wear of the saw has obliterated the next lower series of openings and said openings having their walls diagonal relative to the line of travel of the saw-blade.

3. An abrasive saw having openings formed in the lower edge, said openings having their front and rear edges inclined from vertical lines, and having said front and rear edges diagonal to the line of travel of the saw.

In testimony whereof I have hereunto set my hand in presence of two subscribing witnesses.

ARCHIBALD H. MacNUTT.

Witnesses:
JOSHUA D. CLEVENGER,
W. J. O'DONOHUE.